(12) United States Patent
McKinley (10) Patent No.: US 12,434,502 B1
(45) Date of Patent: *Oct. 7, 2025

(54) INTERACTION-SPECIFIC BUSINESS CARDS

(71) Applicant: Yac Inc., Wilmington, DE (US)

(72) Inventor: Hunter McKinley, Gainesville, FL (US)

(73) Assignee: Yac Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/035,812

(22) Filed: Jan. 23, 2025

Related U.S. Application Data (63) Continuation of application No. 18/740,924, filed on Jun. 12, 2024, now Pat. No. 12,311,690.

(51) Int. Cl.
*B42D 15/02* (2006.01)
*G10L 25/84* (2013.01)

(52) U.S. Cl.
CPC ............ *B42D 15/022* (2013.01); *G10L 25/84* (2013.01)

(58) Field of Classification Search
CPC .............................. B42D 15/022; G10L 25/84
See application file for complete search history.

(56) References Cited

U.S. PATENT DOCUMENTS

| | | | | |
|---|---|---|---|---|
| 5,063,698 A * | 11/1991 | Johnson | ............... | B42D 15/022 379/88.16 |
| 5,836,616 A * | 11/1998 | Cooper | ............... | B42D 15/022 283/56 |
| 6,845,583 B2 * | 1/2005 | Lee | ..................... | B42D 15/022 40/124.06 |
| 7,292,681 B2 * | 11/2007 | Pines | .................. | B42D 15/022 379/88.07 |
| 7,866,550 B2 * | 1/2011 | Clegg | ................. | G06Q 20/204 235/492 |
| 8,800,758 B2 * | 8/2014 | Roberts | ............... | B42D 15/045 206/39.7 |
| 10,468,026 B1 * | 11/2019 | Newman | ................ | G10L 15/26 |
| 10,923,111 B1 * | 2/2021 | Fan | ......................... | G10L 15/16 |
| 11,375,063 B1 * | 6/2022 | Frenkel | .............. | H04M 3/5166 |
| 11,778,462 B2 * | 10/2023 | Stanek | ............... | H04W 12/106 709/206 |
| 2003/0182827 A1 * | 10/2003 | Youngdahl | .......... | B42D 15/022 283/106 |
| 2010/0059983 A1 * | 3/2010 | Galloway | ............. | G06K 19/07 283/56 |

(Continued)

*Primary Examiner* — David R Dunn
*Assistant Examiner* — Christopher E Veraa (57) ABSTRACT

In one embodiment, a method includes recording, by a microphone of a client device, audio in an environment of a user and accessing at least a portion of the audio that includes a conversation between the user and a participant. The method further includes storing the at least the portion of the audio onto a business card of the user in the environment of the user, where the business card has (1) a body made of a lightweight material; (2) a non-transitory computer readable storage media within the body and configured to store at least a portion of an audio; and (3) one or more processors within the body and coupled to the non-transitory computer readable storage media, the one or more processors operable to provide the at least a portion of the audio recording stored on the media for playback at a time subsequent to recording of the audio.

20 Claims, 4 Drawing Sheets

(56) References Cited

U.S. PATENT DOCUMENTS

| | | | | |
|---|---|---|---|---|
| 2011/0119967 | A1* | 5/2011 | Kawesch | B42D 15/022 40/124.03 |
| 2011/0214318 | A1* | 9/2011 | Dunko | B42D 15/022 455/414.1 |
| 2011/0247247 | A1* | 10/2011 | Mayer | B42D 15/022 40/124.03 |
| 2012/0036745 | A1* | 2/2012 | Chen | B42D 15/027 455/41.2 |
| 2012/0309307 | A1* | 12/2012 | D'Amico | G06K 19/07327 235/488 |
| 2013/0036635 | A1* | 2/2013 | Mayer | G09F 9/30 40/124.06 |
| 2013/0239448 | A1* | 9/2013 | Davis | B42D 15/022 40/124.03 |
| 2014/0177813 | A1* | 6/2014 | Leeds | H04M 3/42348 379/67.1 |
| 2015/0019518 | A1* | 1/2015 | Buchanan | B42D 15/0093 707/705 |
| 2015/0052788 | A1* | 2/2015 | Juetten | B42D 15/042 40/124.09 |
| 2015/0100319 | A1* | 4/2015 | O'Shields | G11B 27/00 704/272 |
| 2015/0139508 | A1* | 5/2015 | Ye | G06V 40/70 382/116 |
| 2016/0124469 | A1* | 5/2016 | Frazier | G06F 3/041 345/173 |
| 2019/0001732 | A1* | 1/2019 | Ongsitco | B42D 15/022 |
| 2019/0122010 | A1* | 4/2019 | Huynh | G06K 7/10237 |
| 2019/0123575 | A1* | 4/2019 | Cha | H02J 50/80 |
| 2019/0362714 | A1* | 11/2019 | Mori | G10L 15/22 |
| 2021/0056963 | A1* | 2/2021 | Lee | G10L 15/30 |
| 2021/0082421 | A1* | 3/2021 | Kim | G10L 25/84 |
| 2021/0286577 | A1* | 9/2021 | Ballhatchet | G06F 3/0362 |
| 2021/0318888 | A1* | 10/2021 | Abbasian | G06F 11/3495 |
| 2022/0021985 | A1* | 1/2022 | Wexler | G10L 25/51 |
| 2022/0115020 | A1* | 4/2022 | Bradley | G06F 3/0334 |
| 2022/0293087 | A1* | 9/2022 | Kumar | G10L 15/02 |
| 2023/0111249 | A1* | 4/2023 | Lazar | B42D 25/373 40/124.02 |
| 2023/0142904 | A1* | 5/2023 | Komich | G06F 40/279 704/235 |
| 2023/0164271 | A1* | 5/2023 | DiMaria | H04L 65/403 379/209.01 |
| 2023/0336663 | A1* | 10/2023 | Lekas | H04L 67/141 |
| 2024/0203438 | A1* | 6/2024 | Karadagur Ananda Reddy | G10L 21/0208 |
| 2024/0363094 | A1* | 10/2024 | Masilamani | G10K 11/17827 |
| 2024/0394077 | A1* | 11/2024 | Arat | G06F 9/453 |

\* cited by examiner

INTERACTION-SPECIFIC BUSINESS CARDS

TECHNICAL FIELD

This application generally relates to interaction-specific business cards.

BACKGROUND

Business cards are physical products, typically in card form, that contains basic business information about a person and their professional circumstances, such as where they work, what they do, and contact information (e.g., phone number, email address, physical address, social media information, etc.). Business cards are typically printed on cardstock, a paper that is thicker and more durable than standard printer paper.

Business cards are often exchanged in professional and sometimes personal circumstances to commemorate an interaction. For instance, when two people meet for the first time in a professional capacity, they may exchange business cards to (1) remember the interaction (2) remember the other person to the interaction (e.g., re {member that person's name) and (3) obtain information (e.g., contact information or the name of a company) for following up on the interaction. Among other things, business cards can make interactions more memorable and alleviate the need for individuals in an interaction, which are often relatively brief, to announce and transcribe each other's information.

Business cards are such a staple tool of professional networking that by the late 2010s, approximately 7 billion business cards were printed worldwide each year.

DESCRIPTION OF EXAMPLE EMBODIMENTS

Business cards are often exchanged to commemorate an interaction, but while a business card contains information about one of the participants to an interaction, the business card does not contain any information about the interaction itself. For instance, suppose person A has two separate conversations with person's B and C. Person A may provide her business card to person's B and C, but A's business card will be the same in each instance; in other words, the business card will not contain information unique to each interaction, nor will it identify why the interactions were meaningful enough to warrant providing a business card. For example, an attorney at a conference may meet (1) a potential client who is interested in the attorney's line of work, (2) a colleague who is interested in collaborating with the attorney on an article in an industry publication and (3) a vendor who can provide marketing services for the attorney's law firm. The purpose and content of these business interactions are very different, but in each instance, the attorney's business card is the same, and the conventional business card therefore does nothing to signify the unique importance of each particular interaction.

Figure 1:
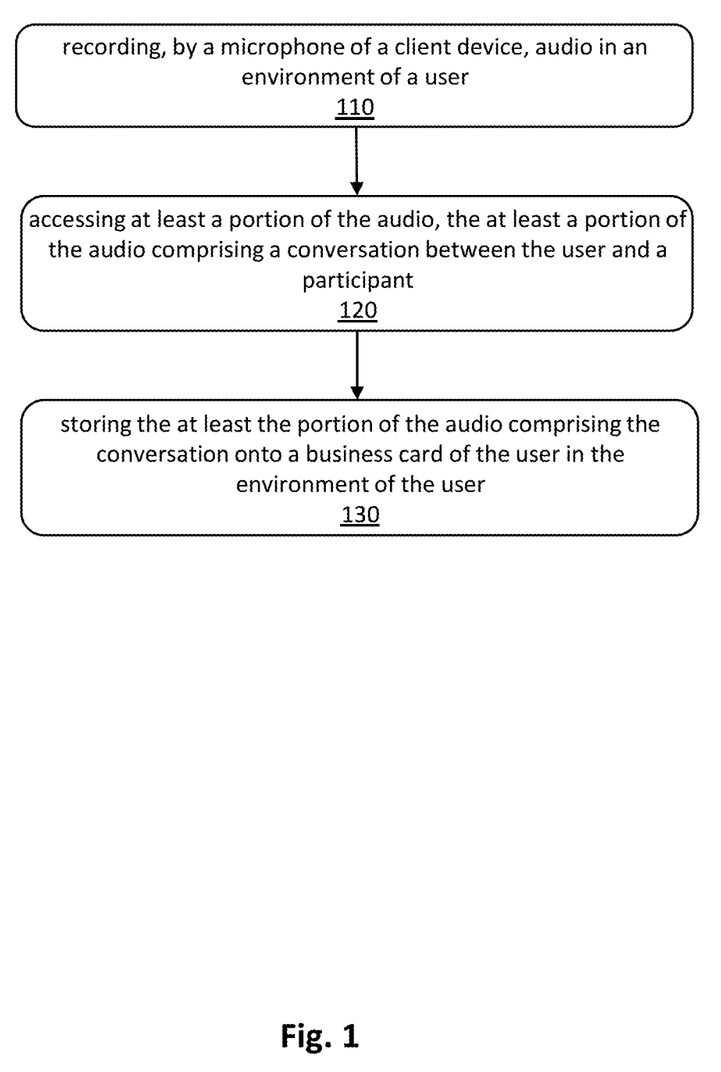
FIG. 1 illustrates an example method for generating an interaction-specific business card.
Figure 2:
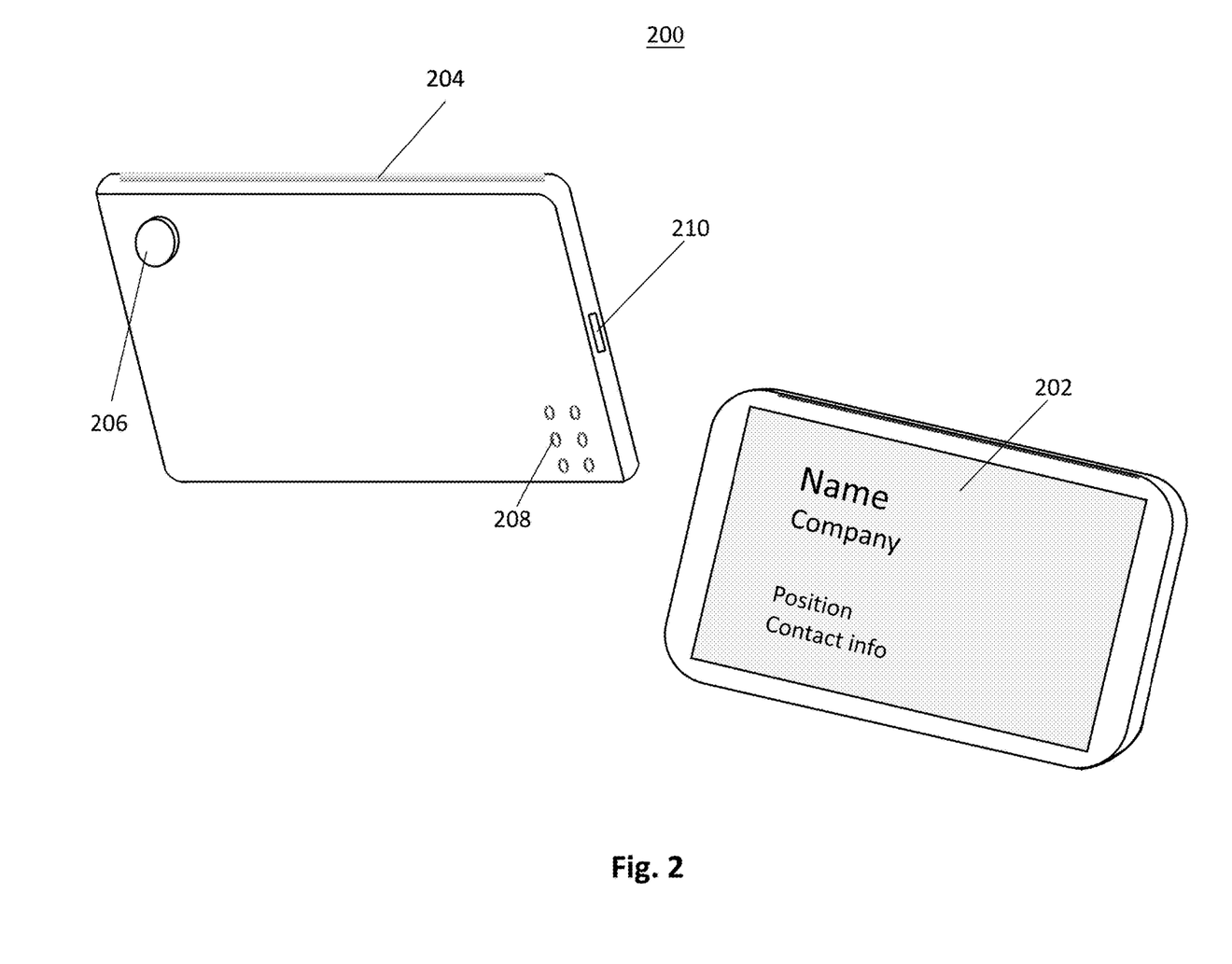
FIG. 2 illustrates an example interaction-specific business card.
Figure 3:
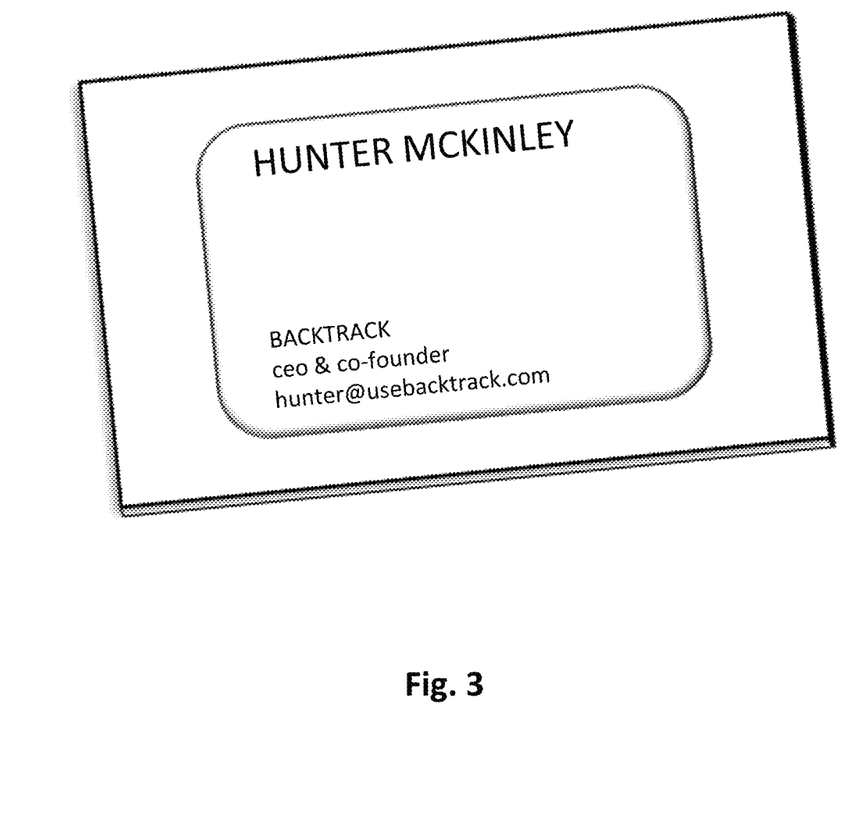
FIG. 3 illustrates an example of a front of an example interaction-specific business card.

In contrast, this disclosure describes techniques and corresponding business cards that contain information specific to each interaction. FIG. 1 illustrates an example method for generating the interaction-specific business card, and FIG. 2 and FIG. 3 illustrate example interaction-specific business cards.

Step 110 of the example method of FIG. 1 includes recording, by a microphone of a client device, audio in the environment of a user. For example, a microphone may be in a client device such as a smartphone, tablet, wearable device, or personal computer. In particular embodiments, the client device may be the microphone itself, e.g. step 110 may be performed by recording audio via a microphone, which may be attached to another client device. As used herein, a microphone is any device for recording audio at the typical frequencies used and heard by humans.

In step 110, the audio is recorded in real-time. Particular embodiments of step 110 may include continuously recording audio. For example, if a user is at a trade show, then a user may activate a microphone, which continuously records audio in the user's environment.

This disclosure contemplates that various actions may trigger recording of audio in step 110. For instance, as mentioned above, a user may affirmatively start a recording process, for example at the beginning of a trade show. A user may also start a recording at the beginning of each unique interaction, e.g., at the beginning of a conversation with a unique participant, but this embodiment requires more effort from the user and relies on the user's ability to remember to start each recording, which can be detrimental in that users' focus in these settings is typically on the interactions they are having, and not on monitoring the status of devices (e.g., recording devices) around them.

In particular embodiments, recording may be activated automatically based on particular environmental triggers. For example, certain predetermined trigger words or phrases (e.g., "hello," "hi," "may name is . . . ," and/or the user's name) may indicate that a new conversation has begun, which may trigger audio recording. As another example, recording may be automatically triggered based on detection of a person in the vicinity of the user (e.g., based on motion detection, facial detection, etc.). For example, a video camera may be placed in the vicinity of the user, and video from the video camera may be used to detect the presence of a person in the vicinity of the user. Other aspects, such as orientation (e.g., whether a person is facing the user) and/or distance between the user and person may be obtained from a video recording, which may include depth information, IR information, etc. In particular embodiments, trained AI models may be used to identify the characteristics described above for automatically triggering audio recording; e.g., audio in the vicinity of the user may be input to a trained AI model to identify trigger words that automatically start the recording process, and/or video in the vicinity of the user may be input to a trained AI model or a face-detection model to identify the presence of a person in the user's vicinity.

A recording may be automatically stopped after an interaction ends, for example via detection of triggers such as stop words or phrases (e.g., "goodbye" "take care" "talk to you later," "here is my card," etc.) and/or by detection of a person leaving the vicinity of the user (e.g., using techniques as described above). In other embodiments, recording may occur continuously, i.e., audio recording may occur before, during, and after a particular interaction between a user and another person.

A user and one or more other persons may engage in a conversation. As described above, a business card may be provided, typically at the end of an interaction, and typically when the interaction is meaningful enough to warrant remembering the interaction or following up on the interaction. On the other hand, many interactions in a professional environment do not warrant an exchange of business cards; for example, a user may see a previously introduced colleague and have a personal chat, but business cards usually would not be exchanged in this instance. As another example, several interactions may be too superficial to warrant exchanges of business cards (e.g., the conversation is focused simply on how the participants are enjoying a conference or an event), and may involve topics unrelated to a person's business (e.g., discussions over whether a shared acquittance is still at a business, or where a refreshment center is, etc.). A person at a professional event may have many interactions over the course of a relatively short period of time, and a person does not know in advance which conversations will be meaningful to a business relationship (the typical instances in which business cards are exchanged) and which will be superficial or personal. Automatically recording audio, whether continuously or based on predefined conditions, ensures that audio is available after the fact for those instances in which a conversation was meaningful, which cannot be fully predicted in advance.

In conventional use cases, a person realizes after the fact that their conversation with another person was significant enough to warrant memorializing, and an exchange of business cards ensues. However, as explained above, business cards are not unique to the specific interaction that just occurred, and given that it just occurred, the participants cannot go back in time to record the conversation they just had. As explained herein, the techniques and apparatuses of the disclosure address the uncertainty as to which conversations are meaningful, and result in the ability to hand someone not just a generic business cards but an interaction-specific business card that is unique to the interaction they just had. In other words, the techniques and apparatuses described herein allow a user to physically hand a participant a copy of a conversation that just occurred.

Step 120 of the example method of FIG. 1 includes accessing at least a portion of the audio, the at least a portion of the audio comprising a conversation between the user and a participant. In particular embodiments, the portion of the audio may be a portion of audio that was tied to the conversation, e.g., by automatically starting and stopping a recording, for instance by using the example techniques described above. In particular embodiments, the portion of the audio may be a portion of a continuously recorded audio. The portion of audio may be identified from the continuously recorded audio in a number of different ways. For example, recency is a critical factor; the most recent audio corresponds to the conversation that just occurred, as the real-time nature of business card exchanges means that a business card is exchanged during (or more typically) after an interaction, although occasionally before. Particular embodiments may use a predetermined amount of type to define the portion of the audio from the continuous recording; for example, the most recent 1 minute, or 3 minutes, or 5 minutes, etc., of recording from the continuously recorded audio may be defined as the portion of the audio in step 120. In particular embodiments, the predetermined amount of time may be adjustable by the user or automatically, e.g., by analyzing the user's past conversation durations and adopting a predetermined time length that reflects those previous conversations.

In particular embodiments, a portion of audio in step 120 may be automatically identified by certain trigger words or phrases, e.g., the portion may be defined by a starting word or phrase (e.g., "hi" "hello" "my name is" the person's name, etc.) and a stopping word or phrase (e.g., "goodbye" "here's my card," etc.). In particular embodiments, the starting and/or stopping words may be defined by a user, such that the user can control how the audio portion will be determined by invoking the starting and stopping words or phrases. In particular embodiments, voice-recognition techniques may be used to identify starting and stopping words or phrases that are verbalized by the user, and not by another participant in the conversation. In embodiments in which modalities other than audio are used (e.g., in which video is used) then starting and stopping conditions may correspond to predetermined input from those modalities (e.g., if the modality is video, then the input may include a person's presence and orientation relative to a user, an identification that the person's or user's mouth is moving, a predetermined signal (e.g., hand motion) of the user or person, etc.).

In particular embodiments, the audio portion of step 120 may be determined based on the absence of spoken audio before or after the conversation, for a predetermined length of time. For instance, if no spoken audio is detected in a recording for, e.g., 30 seconds, and then spoken audio is detected, followed by a period of no spoken audio for, e.g., 10 seconds, then the audio portion may be determined to start at the first spoken audio after the 30 second period and end at the last spoken audio before the 10 second period. The thresholds in this example are for illustration purposes only, and in particular embodiments, these thresholds may be manually or automatically adjusted.

In particular embodiments, when the portion of audio 120 is defined, then post-processing may be applied to the audio. For example, if a non-audio technique is used to identify the portion of audio (e.g., the audio portion is defined by a predetermined time period or by a video signal), then dead space before and after the defined audio portion may be removed. Various filtering, amplification, and/or compression techniques may also be used.

Step 130 of the example method of FIG. 1 includes storing the at least the portion of the audio comprising the conversation onto a business card of the user in the environment of the user. Two distinct example embodiments are described below. In one, the business card contains the microphone for recording the audio (i.e., the business card in step 130 is the client device in step 110), and therefore the business card directly stores the audio portion in a memory embedded within the business card, subsequent to any of the processing described above with respect to step 120. In particular embodiments, if the recording is continuous, then any audio that predates the defined audio portion is deleted, or not stored, in the business card's memory, so that only the audio corresponding to the most recent interaction is stored.

In a second embodiment, the client device in step 110 is not the business card, e.g., the client device may be a smartphone or another computing device that stores audio recorded by the microphone. After the processes described in step 120, the audio portion of step 120 is transferred from the client device to a particular business card, which stores the audio portion in its memory. These processes are described in more detail below, along with example embodiments of the business card. As discussed herein, once the audio portion is stored in the memory of a particular business card, then a user may hand this business card to the participant (or may hand multiple business cards to multiple participants, if there are more than one) that was part of the interaction the user and the participant just had. As a result, the participant has not only a physical business card by which to memorialize the interaction, but in addition, that physical business card is uniquely tailored to the conversation that the participants just had. In essence, the user has the ability to hand the participant a meaningful conversation the participants just had, without requiring the participants to, e.g., disrupt the interaction by manually engaging a device to record the interaction. The techniques described herein also obviate the need for the parties to exchange audio electronically, which would require the participants to, e.g., interact with specific devices (e.g., pull out their smartphones), exchange electronic information (e.g., email addresses or Dropbox URLs), transmit an audio clip using the electronic information, and then confirm that the transmission was successful; such interactions may be awkward and time consuming, and cast the interaction in a more negative light. Finally, as described herein, the techniques described herein allow the user to provide a physical business card that is uniquely tailored to a participant's conversation, obviating the need for deeply impractical scenarios, e.g., a user is not going to record conversations on a smartphone and then hand their smartphone to a participant for the participant to take with them. Nor do the techniques and systems described herein require any affirmative action on the part of the participant.

FIG. 2 illustrates an example embodiment of a business card 200. FIG. 3 illustrates an example front of an example business card 300. A business card in this disclosure may have dimensions similar to a conventional business card. Business card 200 has a relatively rectangular form factor, and is made of a lightweight material, such as a paper material (e.g., cardstock) or a plastic. A business card may include on its exterior information typically conveyed by a conventional business card. This information may be printed directly on the business card, e.g., during a manufacturing process, or a conventional business card may be inserted into a business card of this disclosure, for example, conventional business card 202 may be inserted through slot 204 of business card 200, such that information on conventional business card 202 is viewable on the front of business card 200. In particular embodiments, the front of business card 200 may be a display screen, which can display, e.g., information from a user's conventional business card and/or details about the interaction (e.g., the time and place at which it occurred).

Business card 200 includes a button 206 on its back surface. While button 206 is a physical button, this disclosure contemplates that a business card may include an electronic button, such as a UI element, in addition to or instead of a physical button. Button 206 initiates playback of the audio portion stored on the memory of business card 200. Audio may be played through a speaker behind portion 208 of business card 200. Business card 200 may include one or more electronic interfaces 210, e.g., for charging the components of business card 200 or for transferring information to or from business card 200.

The interior of business card 200 may include various electronics, such as a computer-readable storage media for storing an audio portion and one or more processors for initiating playback of the audio portion and for controlling other electronic function of business card 200. The electronics may be integrated into a single circuit, such as on a PCB, and/or a single chip thereby ensuring a slim form factor for business card 200.

When the business card is not also the client device in step 110 of the example method of FIG. 1, i.e., when an audio portion needs to be transmitted from the client device to the business card, then this transmission may be accomplished using a variety of different approaches. For example, interface 210 of business card 200 may allow for transmission of an audio portion by a direct link, e.g., by a wired cable between the client device and the business card. Transmission may be automated such that when a connection is made between the client device and a business card, the most recent audio portion may be determined and then automatically transmitted to the business card. An application may be executing on the client device that controls this functionality, and may provide a user interface to, for example, initiate transmission between the client device and a business card. Transmission may occur over wireless channels, e.g., over a network connection (e.g., over the internet) or via a Bluetooth, RFID, or NFC connection. Business card 200 may contain the various electronics, such as a transceiver, for establishing a wireless connection and transceiving data over that connection.

In particular embodiments, a set of NFC or RFID tags and readers may be used to communicate information from the client device to the business card. For example, by bringing a business card with an NFC or RFID reader near the client device so as to activate the NFC or RFID tag in the client device, the most recent audio portion may be wirelessly transmitted to the business card, for example via a corresponding antenna in the client device. In particular embodiments, transfer of an audio portion from a client device to a business card may occur when certain phrases or words are detected. For instance, a user may say "hey Backtrack" or "let me hand you my card," and those phrases may automatically trigger the transmission of the most recent audio portion from the client device to the business card, using any of the physical transmission techniques described herein.

In particular embodiments, a business card may also include a tag (e.g., an RFID or NFC tag) so that, when a corresponding reader is brought near the card, then information related to the interaction may be transmitted to reader. For instance, a participant who receives a business card may bring their smartphone near that business card, which then may transmit a URL link to a digital copy of the audio portion that resides on the card. The link may contain additional information, such as a transcript of the audio call, a summary or highlights of the conversation (e.g., as determined by a trained AI model that receives the conversation as input), and the like. In particular embodiments, transcription and/or conversation summarizing or highlighting may be performed by electronics in the business card and stored locally on the business card's memory.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1. Moreover, this disclosure contemplates that some or all of the computing operations described herein, including certain steps of the example method illustrated in FIG. 1, may be performed by circuitry of a computing device described herein, by a processor coupled to non-transitory computer readable storage media, or any suitable combination thereof.

Figure 4:
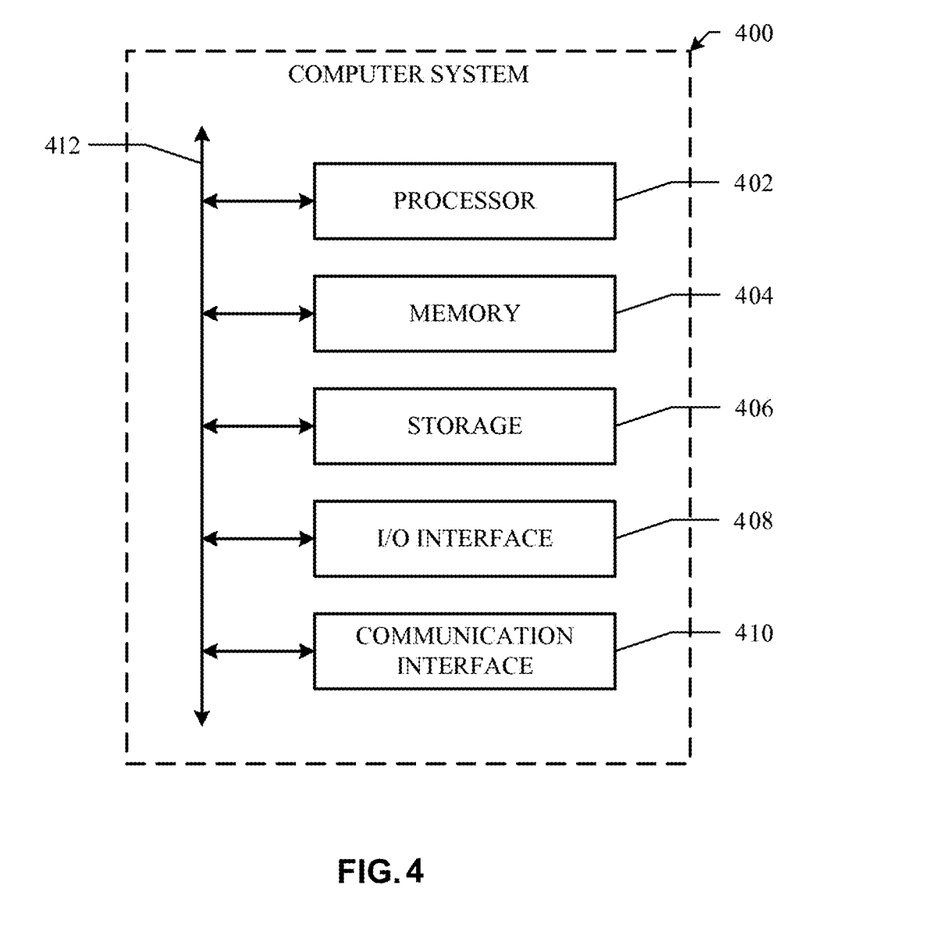
FIG. 4 illustrates an example computing system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:
   recording, by a microphone of a client device, audio in an environment of a user;
   automatically identifying at least a portion of the audio comprising a conversation between the user and a participant by automatically identifying a beginning of the conversation and an end of the conversation; and
   storing the at least the portion of the audio comprising the conversation onto a business card of the user in the environment of the user, the business card comprising:
   a body made of a lightweight material;
   a non-transitory computer readable storage media within the body and configured to store at least a portion of an audio; and one or more processors within the body and coupled to the non-transitory computer readable storage media, the one or more processors operable to provide the at least a portion of the audio recording stored on the media for playback at a time subsequent to recording of the audio.

2. The method of claim 1, wherein:
the recorded audio comprises (1) the conversation between the user and the participant and (2) one or more other conversations; and
automatically identifying the at least a portion of the audio comprises automatically identifying, from the recording of the audio in the environment of the user, a segment of the recorded audio estimated to include only the conversation between the user and the participant.

3. The method of claim 2, wherein the segment of audio comprises the most recently recorded audio of a predetermined time interval from a present time to a previous time.

4. The method of claim 2, wherein automatically identifying the segment of the recorded audio comprises:
detecting, from the recorded audio, one or more starting words;
detecting, from the recorded audio, one or more stopping words; and
determining the segment of the recorded audio as starting with the one or more starting words and stopping with the one or more stopping words.

5. The method of claim 4, further comprising detecting that the one or more starting words and the one or more stopping words correspond in the audio to a voice of the user.

6. The method of claim 2, wherein automatically identifying the segment of the recorded audio comprises:
determining a period of the recorded audio that does not contain vocalization for a predetermined period of time; and
determining a vocalization in the recorded audio after the period of the recorded audio that does not contain vocalization for a predetermined period of time; and
determining the segment of the recorded audio as starting with the vocalization.

7. The method of claim 1, further comprising providing the business card to the participant.

8. The method of claim 1, wherein storing the at least the portion of the audio comprises transmitting the at least the portion of the audio from the client device to the business card.

9. The method of claim 1, wherein automatically identifying the beginning of the conversation and the end of the conversation comprises determining, from a video of the environment of the user, the beginning and the end of the conversation.

10. The method of claim 1, wherein the client device comprises a smartphone, a tablet, a wearable device, or a personal computer.

11. One or more non-transitory computer readable storage media storing software that is operable when executed by one or more processors to:
access a recorded audio of an environment of a user;
automatically identify at least a portion of the audio comprising a conversation between the user and a participant by automatically identifying a beginning of the conversation and an end of the conversation; and
store the at least the portion of the audio comprising the conversation onto a business card of the user in the environment of the user, the business card comprising:
a body made of a lightweight material;
a non-transitory computer readable storage media within the body and configured to store at least a portion of an audio; and
one or more processors within the body and coupled to the non-transitory computer readable storage media, the one or more processors operable to provide the at least a portion of the audio recording stored on the media for playback at a time subsequent to recording of the audio.

12. The media of claim 11, wherein:
the recorded audio comprises (1) the conversation between the use and the participant and (2) one or more other conversations; and
automatically identifying the at least a portion of the audio comprises automatically identifying, from the recording of the audio in the environment of the user, a segment of the recorded audio estimated to include only the conversation between the user and the participant.

13. The media of claim 11, wherein the media is part of a client device comprising a smartphone, a tablet, a wearable device, or a personal computer.

14. The media of claim 13, wherein the software is further operable when executed by the one or more processors to initiate transmission of the at least the portion of the audio from the client device to the business card.

15. An apparatus comprising:
a business card comprising:
a body made of a lightweight material;
a microphone configured to record audio in an environment of a user;
one or more non-transitory computer readable storage media within the body and comprising one or more instructions; and
one or more processors within the body and coupled to the non-transitory computer readable storage media, the one or more processors operable to execute the instructions to:
automatically identify at least a portion of the audio comprising a conversation between the user and a participant by automatically identifying a beginning of the conversation and an end of the conversation;
store the at least a portion of an audio recording on the business card; and
provide the at least a portion of the audio recording stored on the media for playback at a time subsequent to recording of the audio.

16. The apparatus of claim 15, wherein the business card further comprises one or more speakers configured to playback the portion of the audio recording.

17. The apparatus of claim 15, further comprising an interactive element on the body of the business card for initiating playback of the portion of the audio recording.

18. The apparatus of claim 15, further comprising a transceiver configured to receive, from the client device, the portion of the audio recording.

19. The apparatus of claim 15, further comprising an NFC tag and an antenna configured to transmit information comprising a URL identifying a location of a digital copy of the portion of the audio.

20. The apparatus of claim 15, wherein:
the recorded audio comprises (1) the conversation between the user and the participant and (2) one or more other conversations; and automatically identifying the at least a portion of the audio comprises automatically identifying, from the recording of the audio in the environment of the user, a segment of the recorded audio estimated to include only the conversation between the user and the participant.

* * * * *